Dec. 13, 1938.  W. R. HUME  2,140,384
MACHINE FOR TRIMMING AND/OR BEVELING THE EDGES OF METAL PLATES
Filed Jan. 19, 1938  4 Sheets-Sheet 1

INVENTOR
W. R. HUME
By Young, Emery & Thompson
ATTYS.

Dec. 13, 1938.  W. R. HUME  2,140,384
MACHINE FOR TRIMMING AND/OR BEVELING THE EDGES OF METAL PLATES
Filed Jan. 19, 1938   4 Sheets-Sheet 2
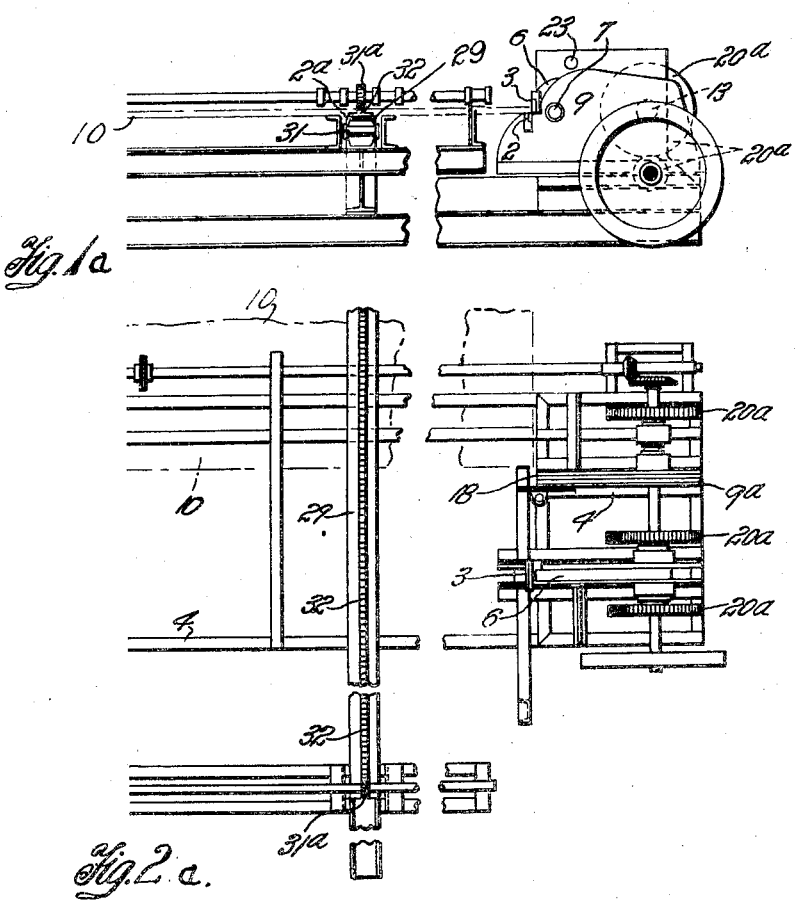
INVENTOR
W. R. HUME
ATTYS.

Dec. 13, 1938.  W. R. HUME  2,140,384
MACHINE FOR TRIMMING AND/OR BEVELING THE EDGES OF METAL PLATES
Filed Jan. 19, 1938    4 Sheets-Sheet 3
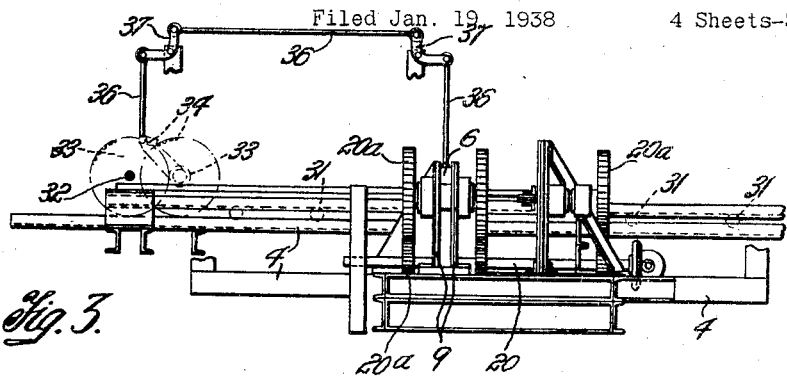
Fig. 3.
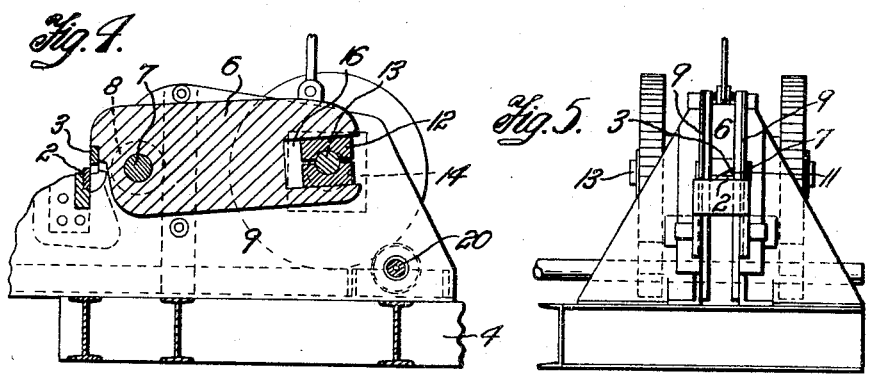
Fig. 4.   Fig. 5.
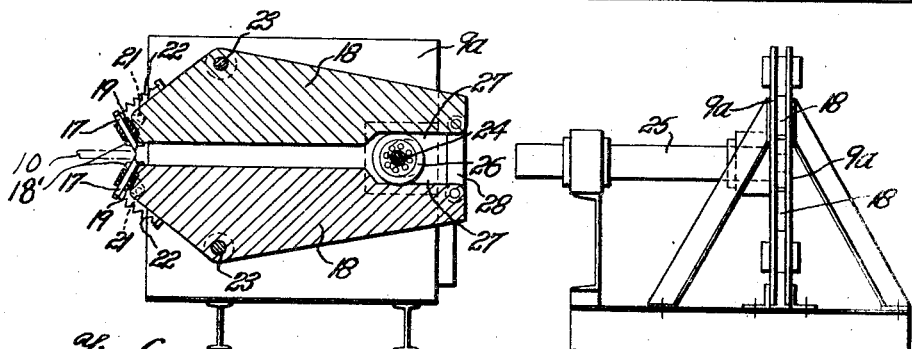
Fig. 6.
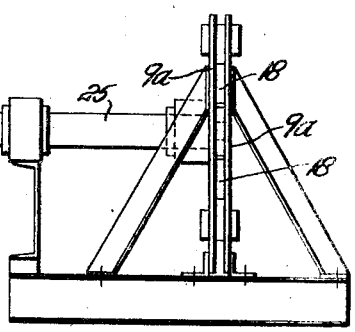
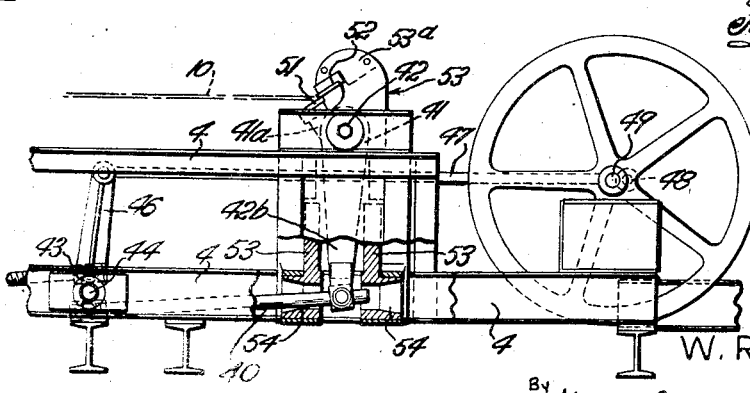
Fig. 7.   Fig. 8.
INVENTOR
W. R. HUME
BY Young, Emery & Thompson
ATTYS.

Dec. 13, 1938.  W. R. HUME  2,140,384
MACHINE FOR TRIMMING AND/OR BEVELING THE EDGES OF METAL PLATES
Filed Jan. 19, 1938  4 Sheets-Sheet 4
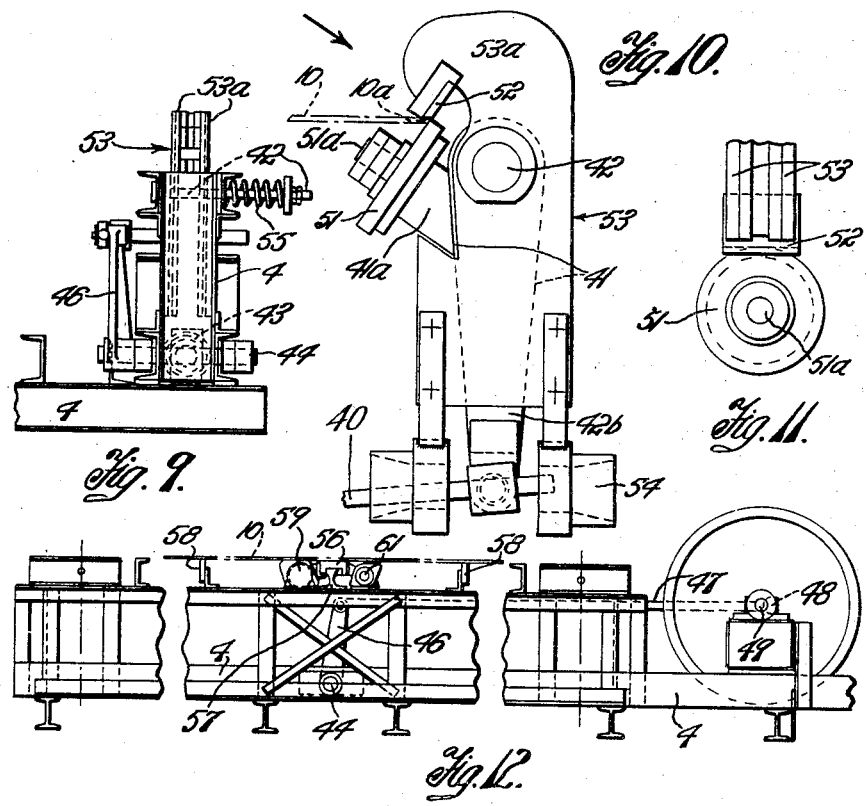
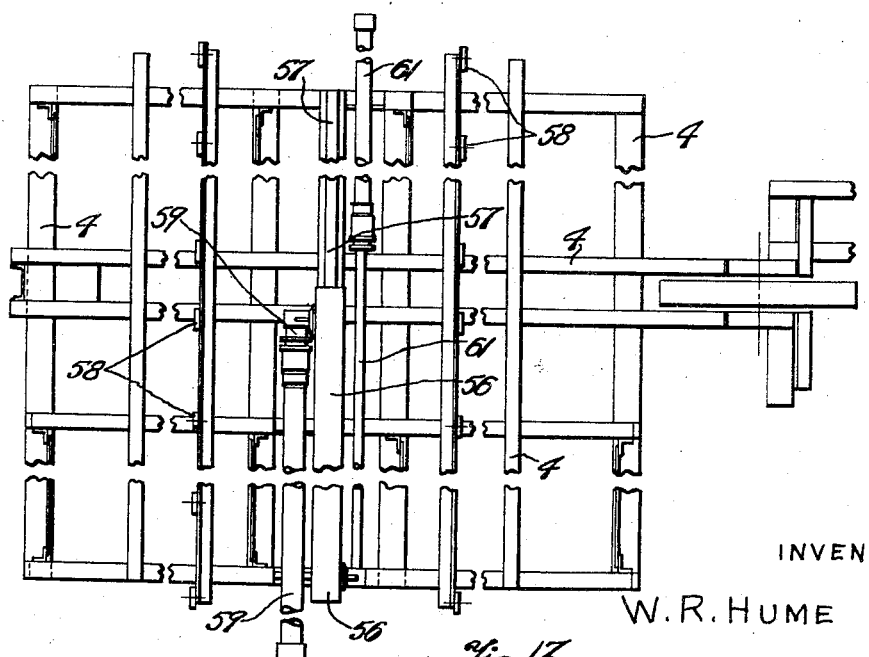
INVENTOR
W. R. HUME Patented Dec. 13, 1938

2,140,384

UNITED STATES PATENT OFFICE 2,140,384

MACHINE FOR TRIMMING AND/OR BEVELING THE EDGES OF METAL PLATES

Walter Reginald Hume, Melbourne, Victoria, Australia, assignor to Hume Steel Limited, Melbourne, Victoria, Australia Application January 19, 1938, Serial No. 185,771
In Australia October 27, 1936

11 Claims. (Cl. 164—41)

This invention relates to an improved machine which may be used for trimming and/or beveling the edges of metal plates, particularly relatively thick plates, such, for example, as those in the region of one-half to one inch in thickness, and which are usually too heavy or the selvedge too narrow for trimming by the rotary or other metal shearing machines commonly employed for trimming the edges of thinner plates.

The improved machine is particularly adapted for trimming and beveling the edges of metal plates preparatory to welding such edges together in the formation of metal pipes and the like.

The machine may be adapted only for trimming off the uneven edges or for beveling the trimmed edges, or it may be designed to carry out both these functions by a suitable arrangement of the trimming and beveling devices whereby the uneven edge is first trimmed off and the trimmed edge is beveled either with a single bevel extending the full thickness of the sheet in one direction or by a double bevel forming a V-shaped edge.

Referring to the drawings which form part of this specification:—

Figures 1 and 1a taken together represent a semi-diagrammatic front view of a machine in accordance with the invention, the work plate being indicated in dot and dash lines and parts being broken away for convenience of illustration.

Figures 2 and 2a taken together represent a plan of the arrangement seen in Figures 1 and 1a.

Figure 3 is an end view looking at the right-hand end of the machine seen in Figures 1a and 2a.

Figure 4 is an enlarged part-sectional view of one of the trimming or "nibbling" devices seen in Figures 1, 2 and 3.

Figure 5 is a view looking at the left-hand end of Figure 4.

Figure 6 is an enlarged detail view of one of the beveling devices seen in Figures 1, 2 and 3.

Figure 7 is a view looking at the left-hand end of Figure 6.

Figure 8 is a part sectional front view of portion of a modified machine in accordance with the invention.

Figure 9 is a fragmentary view looking in the direction of the arrow in Figure 8.

Figure 10 is an enlarged detail view of certain of the parts seen in Figures 8 and 9.

Figure 11 is a detail view of the cutting tools looking in the direction of the arrow in Figure 10.

Figure 12 is a semi-diagrammatic view illustrating suitable feed mechanism for feeding the work plate to the cutting tools seen in Figures 8, 10 and 11, portions being broken away and omitted for convenience of illustration.

Figure 13 is a plan of Figure 12.

Figure 1:
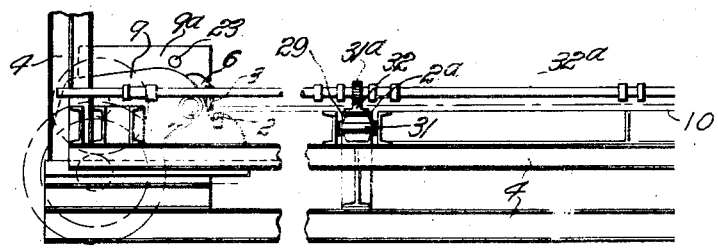

In accordance with the invention, as illustrated in Figures 1 to 5, the trimming operation may be effected by means of a pair of co-acting cutting blades 2 and 3, one of which is stationarily mounted upon the frame 4 of the machine, whilst the other is mounted upon the front end of a rocking beam 6 which is pivoted adjacent the end carrying the cutter 3 upon a fulcrum pin 7, mounted in suitable bearings 8 on the machine frame or on side plates 9 carried thereby.

The rocking beam 6 is mounted between the two side plates 9 to which the lower stationary blade is attached, the cutting edge of the stationary blade being preferably horizontally disposed, as seen in Figure 5, whilst the reciprocating blade 3 is inclined in relation thereto, so that when the latter blade is in its normal or raised position an open mouth indicated at 11, is formed between the upper side or point of the inclined blade and the adjacent side of the stationary blade to receive the sheet to be cut. This sheet or plate is indicated in broken lines at 10 in Figures 1, 2, 6, and 8. The lower side or point of the inclined reciprocating blade is always in contact with the adjacent part of the stationary blade even when the reciprocating blade is at the top of its stroke. The extent of this stroke is very slight, so that only a small amount of the plate is cut at each reciprocation of the rocking beam 6.

The rocking beam 6 is preferably operated by means of a sliding block 12 carried by a crank axle or shaft 13 which is also mounted in suitable bearings 14 on the machine frame. The sliding block 12, which is split so that it may be placed upon the crankshaft 13, is disposed between the aforesaid side plates 9 and works in a recess 16 in the end of the rocking beam, remote from the cutters. The fulcrum pin 7, which is located between the cutters and the crankshaft, is much nearer to the cutters than to the crankshaft, so that the reciprocating movement of the rocking beam at the crankshaft end is considerably greater than at the cutter end and a powerful cutting action with small movement of the cutters is obtained.

The beveling operation may be effected by means of beveling tools 17 (Fig. 6) mounted upon the front ends of a pair of rocking beams 18, the tools being set at a suitable angle to form the desired bevel on the edge of the work plate 10 as it is fed past the tools.

The beveling tools may be in the form of cylindrical rods having inclined cutting edges and mounted in tool holders 19 at a suitable angle in relation to each other, to form a double bevel or V-shaped edge on the work plate 10 which has already been trimmed. The tool holders 19 may be pivoted as at 21 on the front ends of the rocking beams 18 and fitted with springs 22 to ensure that after the return strokes of the beams the tools are brought back to position ready for the next working stroke. The movement of the tool holders 19 under the action of springs 22 is limited by engagement of the tool with the noses 18' of the levers 18. The rocking beams 18 are mounted between side plates 9a on the machine frame.

The rocking beams 18 carrying the beveling tools 17 are mounted upon fulcrum pins 23 which are supported on the side plates 9a and are disposed nearer the ends of the beams carrying the tools than the opposite ends, adjacent which an operating crank or the like 24 on a shaft 25 is disposed. This crank may carry a roller 26 mounted in opposite recesses 27 formed in the inner faces of the rocking beams, the adjacent or rear ends of the beams being connected together by links 28 so that the two beams move together under the influence of the operating crank or the like 24. This construction causes the cutters to act alternately.

The work plate 10 may be fed through the machine either continuously or synchronously with the strokes of the rocking beams carrying the reciprocating cutter and/or the beveling tools as hereinafter described.

Figure 2:
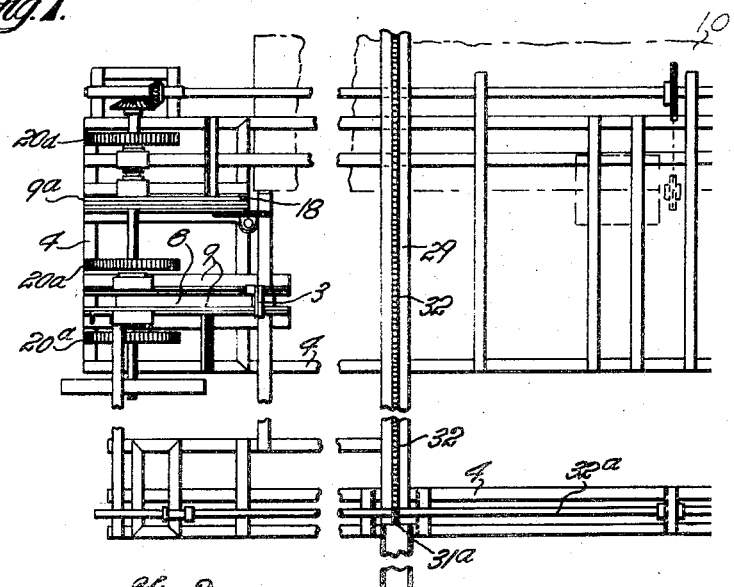

The trimming and beveling devices may constitute separate machines but they are preferably arranged as in Figures 1, 2 and 3 so that the reciprocating cutter 3 and the beveling tools 17 are operated from a common shaft 20 which, through suitable gearing 20a, drives the shafts 13 and 25, whereon the cranks for operating the rocking beams 6, 18 on which the reciprocating trimming tool and the beveling tools are mounted as aforesaid. Thus the work plate 10 may be trimmed and then beveled as it is fed first past the trimming cutters and then past the beveling tools, the feed movement being preferably synchronized with the operation of the cutters and beveling tools as hereinafter described.

In order to simultaneously trim and bevel two opposite ends of the work plate 10, a pair of trimming cutters and beveling tools may be arranged at opposite ends of the machine frame 4 to engage the opposite ends of the work plate as it is fed therebetween. In this case the inclined cutting blades of the two trimming devices are oppositely arranged to receive the opposite edges of the work plate which may be clamped to bearers 29 adapted to move on rollers 31 under the influence of a suitable feed gear as seen in Figures 1, 2 and 3. This feed gear may consist of toothed racks 32 carried by the bearers 29 and engaging pinions 31a on a shaft 32a which may be actuated through the medium of gear wheels 33, a pawl and ratchet mechanism 34 and links and levers 36, 37 from the aforesaid rocking beams 6, so that the intermittent feed movement of the work plate 10 is synchronized therewith. These bearers 29 and racks 32 are sufficient to hold the plate while being subjected to the action of the beveling tools.

According to a modification, as illustrated in Figures 8 to 11, the trimming and beveling of the work plate 10 may be carried out as a single action by means of cutting tools or blades which are suitably inclined to trim off the uneven edges at an angle to the plate thus forming a beveled edge 10a during the trimming operation. In this case rocking beams or levers 41 may be intermediately pivoted on fulcrum pins 42 at each side of the machine, the tools being mounted on short arms 41a of the levers, the longer arms 42b of which are connected by rods 40 to a rocking member 43 carried by a rocking shaft 44 which is operated through the medium of an arm 46 and connecting rod 47 from a crank 48 on a crankshaft 49.

In this modification reciprocating cutting tools 51 are disposed at a suitable angle to the work plate 10 according to the desired angle of the beveled edge to be cut and co-operating stationary cutting tools 52 may be arranged above the reciprocating tools 51. These stationary tools, as well as the rocking beams or levers 41, carrying the reciprocating tools, may be mounted upon suitable side frames 53 which may comprise spaced cheeks 53a between which the levers 41 are mounted. These side frames are pivotally supported upon pivot pins or trunnions 54 disposed at right angles to the axes of the fulcrum pins 42. These trunnions may be hollow, as seen in Figures 8 to 10, to accommodate the connecting rods 40. Springs 55 may be arranged around the fulcrum pins 42 in such a manner as to exert pressure on the pivoted side frames 53 and consequently the cutting tools 51 and 52, in a direction opposed to the direction of feed of the work plate 10 which may be thus fed continuously against the spring influenced cutting tools as hereinafter described.

In order to effect this continuous feed movement, the work plate 10 may be clamped to a bearer or carriage 56 (Figures 12 and 13), which slides on a guide rail 57 mounted on the machine frame 4. The latter also carries supporting rollers 58 upon which the work may rest. A hydraulic ram 59 attached to the carriage or bearer 56 feeds the latter and the work plate 10 continuously forward, past the cutting tolls 51 and 52, the springs 55 permitting the tools to yield about the axis of the trunnions 54 under the forward pressure of the work plate during the cutting stroke of the reciprocating tools 51 on the rocking lever 41. During the reverse or idle stroke of the cutting tools 51, the springs 55 return the tools 51 and 52 with the pivoted side frames 53 to their normal position. A second hydraulic ram 61 may return the carriage 56 to its original position to receive another plate after the trimming and beveling operation has been completed, the rams being controlled by suitable valves not shown.

The reciprocating cutting tools 51 may be fixed to the short arms 41a of the rocking levers 41 or, as seen in Figures 10 and 11, they may be of circular or disc formation and freely mounted on bearing pins 51a carried by the lever arms 41a. Wear on the circular cutting tools may thus be distributed by turning the tools about their axes.

Having now described my invention what I claim as new and desire to secure by Letters Patent is:—

1. A machine for trimming and beveling the edges of metal plates, comprising a machine frame, a rocking lever, fulcrum means intermediate said lever for mounting the lever and providing a short and long arm, a trimming and beveling tool carried by the short arm of said lever, a stationary tool, and a spring-influenced support carried by the frame for supporting said fulcrum means.

2. A machine for trimming and beveling the edges of metal plates, comprising a machine frame, a support, a rocking lever, fulcrum means intermediate the ends of said lever for mounting the lever on said support, a trimming and beveling tool carried by one end of the lever, a stationary blade carried by said support, and means for resiliently mounting said support on said machine frame.

3. A machine for trimming and beveling the edges of metal plates, comprising a machine frame, a support, a rocking lever, fulcrum means intermediate the ends of said lever for mounting the lever on said support, a stationary tool, a trimming and beveling tool carried by one end of said lever and adapted to cooperate with the stationary tool to trim and bevel the edge of a plate in one operation, means for mounting the lever-carrying support to swing about an axis at right angles to the axis of the fulcrum means, means for feeding a plate to said tools, and resilient means urging said lever-carrying support in a direction opposite to the feed of the plate to permit the trimming and beveling tools to yield bodily against the forward movement of the plate.

4. A machine for trimming and beveling the edges of metal plates, comprising a machine frame, a support, a substantially vertically extending rocking lever, a substantially horizontal fulcrum intermediate said lever for mounting the lever on said support and dividing the lever into an upper short arm and a lower long arm, a stationary tool carried by said support, a trimming and beveling tool mounted on the short arm of the lever, means at the bottom of said support for mounting the latter to swing about a substantially horizontal axis at right angles to the axis of the fulcrum, means for feeding a plate to said tools, and resilient means urging said lever-carrying support in a direction opposite to the feed of the plate to permit the trimming and beveling tools to yield bodily against the forward movement of the plate.

5. A machine for trimming and beveling the edges of metal plates, comprising a machine frame, a support, a substantially vertically extending rocking lever, a substantially horizontal fulcrum intermediate said lever for mounting the lever on said support and dividing the lever into an upper short arm and a lower long arm, a stationary tool carried by said support, a trimming and beveling tool mounted on the short arm of the lever, means at the bottom of said support for mounting the latter to swing about a substantially horizontal axis at right angles to the axis of the fulcrum, means for feeding a plate to said tools, resilient means urging said lever-carrying support in a direction opposite to the feed of the plate to permit the trimming and beveling tools to yield bodily against the forward movement of the plate, the trunnions of said support being hollow, and means extending through one of said hollow trunnions to impart movement to the long arm of said lever.

6. A machine for trimming and beveling the edges of metal plates, comprising a machine frame, a support, a rocking lever, fulcrum means intermediate the ends of said lever for mounting the lever on said support, a stationary tool, a trimming and beveling tool carried by one end of said lever and adapted to cooperate with the stationary tool to trim and bevel the edge of a plate in one operation, means for mounting the lever-carrying support to swing about an axis at right angles to the axis of the fulcrum means, means for feeding a plate to said tools, and resilient means mounted on said fulcrum means for urging said lever-carrying support in a direction opposite to the feed of the plate to permit the trimming and beveling tools to yield bodily against the forward movement of the plate.

7. A machine according to claim 3, in which the trimming and beveling tool comprises a disc rotatably mounted on said lever.

8. A machine according to claim 4, in which the trimming and beveling tool comprises a disc and a bearing pin for rotatably mounting the disc on said short arm of the lever.

9. A machine for trimming and beveling the edges of metal plates, comprising a machine frame, a support, a rocking lever, fulcrum means intermediate the ends of said lever for mounting the lever on said support, a stationary tool, a trimming and beveling tool carried by one end of said lever and adapted to cooperate with the stationary tool to trim and bevel the edge of a plate in one operation, means for mounting the lever-carrying support to swing about an axis at right angles to the axis of the fulcrum means, means for feeding a plate to said tools, resilient means urging said lever-carrying support in a direction opposite to the feed of the plate to permit the trimming and beveling tools to yield bodily against the forward movement of the plate, said plate-feeding means including a plate carrier, and means for continuously feeding the carrier and plate past the trimming and beveling tools against the pressure of the resilient means associated with said support.

10. A machine for trimming and beveling the edges of metal plates, comprising a machine frame, a support, a rocking lever, fulcrum means intermediate the ends of said lever for mounting the lever on said support, a stationary tool, a trimming and beveling tool carried by one end of said lever and adapted to cooperate with the stationary tool to trim and bevel the edge of a plate in one operation, means for mounting the lever-carrying support to swing about an axis at right angles to the axis of the fulcrum means, means for feeding a plate to said tools, resilient means urging said lever-carrying support in a direction opposite to the feed of the plate to permit the trimming and beveling tools to yield bodily against the forward movement of the plate, said plate-feeding means including a plate carrier, and a hydraulic ram for continuously feeding the carrier and plate past the trimming and beveling tools against the pressure of the resilient means associated with said support.

11. A machine for trimming and beveling the edges of metal plates, comprising a machine frame, a support, a rocking lever, fulcrum means intermediate the ends of said lever for mounting the lever on said support, a stationary tool, a trimming and beveling tool carried by one end of said lever and adapted to cooperate with the stationary tool to trim and bevel the edge of a plate in one operation, means for mounting the lever-carrying support to swing about an axis at right angles to the axis of the fulcrum means, means for feeding a plate to said tools, resilient means urging said lever-carrying support in a direction opposite to the feed of the plate to permit the trimming and beveling tools to yield bodily against the forward movement of the plate, said plate-feeding means including a plate carrier, a hydraulic ram for continuously feeding the carrier and plate past the trimming and beveling tools against the pressure of the resilient means associated with said support, and a second hydraulic ram for returning the plate carrier to its starting position.

WALTER REGINALD HUME.